March 24, 1970  D. D. MacPHAIL, SR  3,502,539
LAMINATED PRODUCT AND PROCESS
Filed July 14, 1966
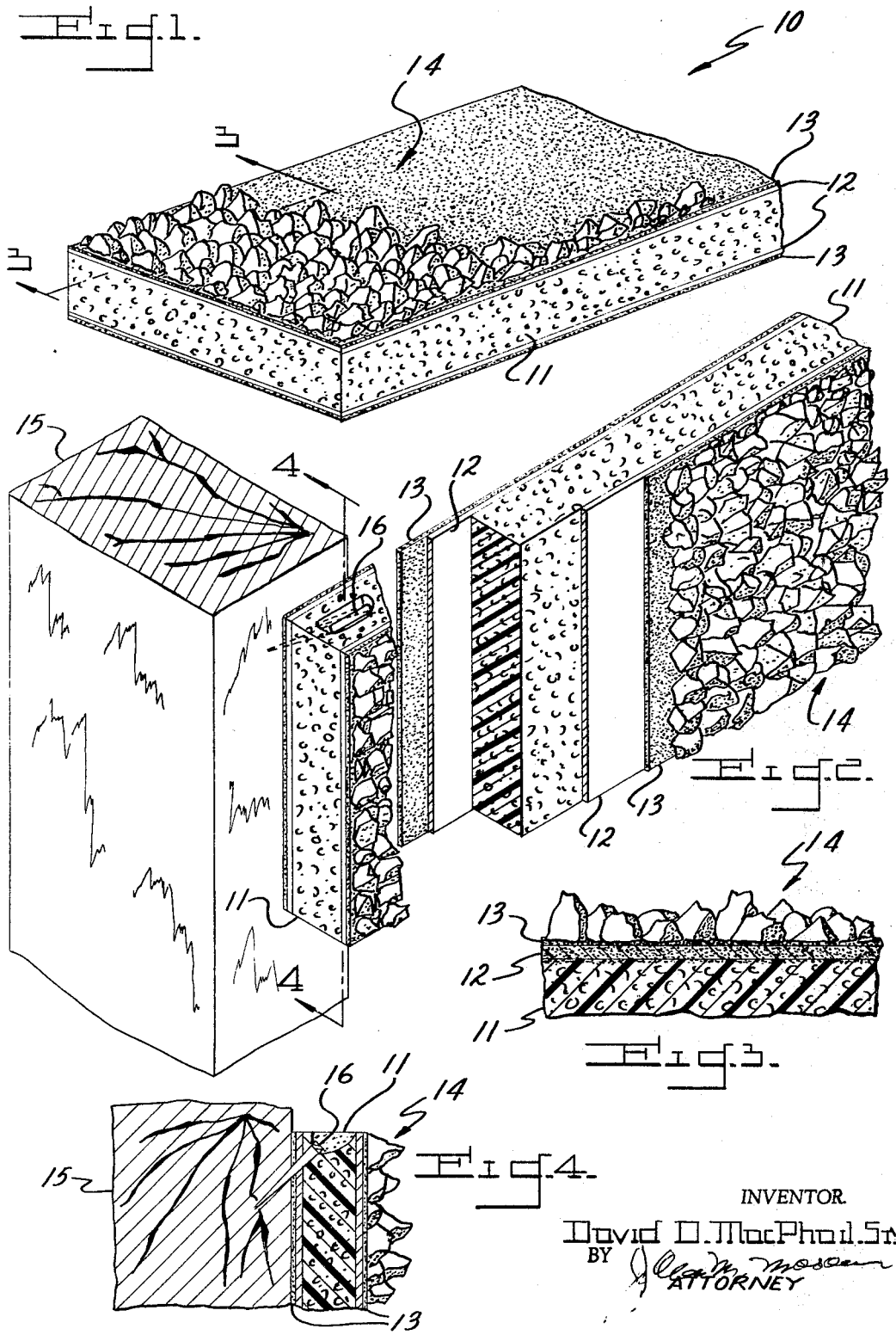
INVENTOR.
David D. MacPhail, Sr.
BY
ATTORNEY 3,502,539
LAMINATED PRODUCT AND PROCESS
David D. MacPhail, Sr., Thompsonville, Conn., assignor to Monsanto Company, St. Louis, Mo., a corporation of Delaware
Filed July 14, 1966, Ser. No. 565,148
Int. Cl. B32b 5/18
U.S. Cl. 161—160                                  10 Claims

ABSTRACT OF THE DISCLOSURE

Disclosed herein is a laminated wall structure comprising: (A) a resinous foam core; (B) an absorbent paper facing sheet adhered to at least one side of the resinous foam core; (C) an adhesive adhered to the absorbent paper facing sheet and permeating it thereby coming into contact with and adhering to the resinous foam core; and (D) an outer veneer surface adhered to the adhesive. A method of preparing such a laminated wall structure is also claimed.

---

The present invention relates to wall structures and more particularly to laminates of a resinous foam, paper, an adhesive permeating the paper, and an outer decorative veneer. These laminates, in addition to being attractive, are useful as barriers of water vapor, heat and sound.

The use of decorative veneers for wall and other surfaces is well-known in the construction industry. Utilization of such veneers contributes markedly to the lowering of building costs, since substantially smaller quantities of relatively expensive materials are needed and further, because of greatly diminished weight, larger sections can be erected in fewer man-hours. The low-cost rejuvenation of older buildings has also been facilitated through the use of such veneers. On the other hand, although coverings of this nature have shown a high degree of utility and have gained wide public acceptance, certain inherent deficiencies have heretofore prevented as extensive an application as might otherwise have been the case. The very thinness which makes possible inexpensive construction has also permitted the virtually unconstrained passage of heat, noise, and moisture. Remedying these defects by the inclusion of an insulating layer behind the outer surface is well-known in the art but presents a new problem concerned with the means of attaching the veneer surface to the insulation. If nails, bolts, or the like are used, the sound will be transmitted by the metallic nature of the fasteners and will defeat the acoustical advantages of the insulation. Attachment by means of adhesives overcomes this objection, but requires that an adhesive system be formulated which will provide a strong bond between dissimilar material, resisting both tensile and shearing forces. Various attempts have been made to form a composite system which would overcome the disadvantages of veneers used alone but the success of these has apparently been marginal.

It is therefore an object of this invention to provide a laminate structure which will combine outward attractiveness and lightness in weight with resistance to the passage of water vapor, heat and sound.

It is a further object of this invention to prepare a laminated structure which is characterized by a sheet of resinous foam having adhered to at least one surface thereof an absorbent paper suitable for the absorption and transfusion of adhesives and an outer veneer surface adhered to the foam-paper laminate by means of an adhesive which permeates the paper and thereby becomes contiguous and adherent to the surface of the underlying foam.

It is still another object of this invention to prepare laminated structures as the above which are suitable for use as non-bearing wall structures.

Other objects and advantages of the invention will be apparent from the description thereof hereinafter.

The objects of this invention are accomplished by fabricating a water vapor barrier laminate adapted for use as a veneer base comprising a resinous foam core having adhered to at least one side thereof an absorbent paper suitable for the absorption and transmission of adhesives which will tenaciously adhere to the veneer surface and to the surface of the underlying foam. These resinous foam laminates with veneer adhered thereto can be attached to a bearing surface, such as a stud wall, in any conventional manner to provide a wall structure having the advantages of thermal insulation, moisture inhibition, acoustical isolation and easy installation.

The present invention may be more fully described in connection with the drawings wherein:

FIGURE 1 is a cross-section of the laminate showing the resinous foam core with paper facing sheets, adhesive and veneer surface attached;

FIGURE 2 is a cutaway view of the same laminate shown in FIGURE 1 attached to a wall structure;

FIGURE 3 is an enlarged fragmentary view of the upper portion of the laminate shown in FIGURE 1; and FIGURE 4 is a section on line 4—4 of FIGURE 2.

The laminate 10 of FIGURE 1 may be prepared in any conventional manner. Customarily, a resinous foam layer 11 is prepared and thereafter at least one facing sheet is attached by means of heat and pressure or an adhesive. The exact methods will, of course, depend on the method of preparing the foam. Also, such a foam-paper structure may be prepared by inter-foaming between facing sheets such as is described in U.S. Patent 2,744,042.

For the purpose of this invention, any paper capable of absorbing adhesives and which will readily adhere to the foam substrate will suffice for the facing sheets 12. It has been found that 42 lb. natural kraft liner board is particularly useful for this purpose.

The liner board facing sheet performs several important functions and its inclusion is critical to the invention. For example, the liner imparts to the system an enhanced degree of impact resistance, in that when struck by an object it acts to distribute the stresses, diminishing the damage which would otherwise be sustained in its absence. The facing sheet also provides a smooth and level surface which greatly facilitates fastening the laminate to the load-bearing wall. Finally, the porous, fibrous structure of the prepare provides a framework in the nature of a matrix which enhances the strength of the adhesive and acts to ensure uniform distribution of the adhesive to the surface of the foam core. These examples are merely intended to be illustrative of the utility and necessity of inclusion of the liner board and should in no way be construed as limiting the scope of the invention.

In the preparation of the resinous foam laminates of this invention, any of the well-known classes of resinous foams may be used. For example, alkyd resin foams as described in U.S. Patent 2,740,743; foamed polyurethanes as described in Polyurethanes, by Bernard Dombrow, Reinhold Publishing Company, 1957; rigid polyvinyl chloride foams; phenolic resin foams; epoxy foams; urea foams; etc.; as described in Modern Plastics Encyclopedia 1966 and foams of polystyrene, rubber-modified polystyrene and acrylonitrile-butadiene-styrene copolymers may be used in preparing the resinous foam laminates of this invention in accordance with customary practices. Useful resinous foams are further identified in the references noted in Applied Science and Technology Index, 1960, pages 1031 and 1032, etc.

The thickness of the resinous foam cores is not critical and may range from very thin to relatively thick cores. Customarily, in practical application, the thickness of the resinous foam cores will range from 0.05 inch to 2.0 inches. However, resinous foam cores ranging from about ⅛ inch to 1.0 inch in thickness are most practical for most applications. The density of the resinous foam cores will customarily range from about 1–10 lbs. per cubic foot. Particularly useful densities range from about 1.5–5 lbs. per cubic foot.

Adhesive materials 13 are next applied in any conventional manner to at least one of the exposed surfaces of the paper facing sheets. In the case of a laminate having more than one adhesive layer, the adhesive used in each layer may be, but is not necessarily, the same. The exact adhesive formulations utilized will vary depending upon the requirements of the particular materials to be bonded. Among the various adhesives contemplated by this invention are glues derived from animals, fish, casein or soybeans; adhesives based on various rubbers such as natural, reclaimed, butyl, nitrile, styrenebutadiene or neoprene; polysulfide adhesives; phenolic resin adhesives; resorcinol resin adhesives; amino resin adhesives; isocyanate based adhesives; polyvinyl acetate adhesives; polyvinyl acetal adhesives; polyvinyl ether adhesives; cyanoacrylate adhesives; and polyamide adhesives. Epoxy resin adhesives have been found to be especially useful in that they adhere to a wide variety of substrates, possess great strength, and impart a substantial degree of fire-proofness to the paper-foam composite. These adhesives are well described in "Handbook of Adhesives," edited by Irving Skeist, Reinhold Publishing Company, 1962. The adhesive used must, of course, be of sufficient fluidity to permeate the paper facing sheet within a reasonable period of time. Therefore, if high molecular weight polymeric adhesives of high viscosity are to be used, dilution with an appropriate solvent may be necessary.

Finally, a veneer surface 14 is brought into contact with one of the adhesive coatings and adhered thereby to the interior parts of the laminate. The composition of the veneer surface may be exemplified by, but is not limited to, such widely diverse materials as wood, brick, stone, metal, ceramic, synthetic resin, cloth, glass, etc. A particularly desirable veneer surface from the point of view of appearance and economy has been found to be marble chips.

The prepared laminate 10 may be adhered to a bearing structure, such as a stud wall 15, by any conventional means. The cutaway section shown in FIGURE 2 illustrates one embodiment of the invention whereby the laminate is attached to the stud wall by means of a staple 16. the cutaway laminae shown are the resinous foam core 11, the paper facing sheets 12, the adhesive layers 13, and the veneer surface 14.

FIGURE 3 illustrates the critical point of the invention that the adhesive layer 13 permeates the paper facing sheet 12 and adheres to the surface of the underlying resinous foam layer 11. The veneer surface 14 is also shown adhered to the adhesive 13.

FIGURE 4 is a section along line 4—4 of FIGURE 2 better illustrating one means by which the laminate may be attached to a stud wall 15, that is, by means of a staple 16 driven at an angle into the foam layer 11 and penetrating into the stud wall. Incidental to the driving of the staple is the formation of a depression in the foam layer and the consequent compression of the foam at that point. The depression so caused is also shown in FIGURE 4.

The invention is best illustrated by the fabrication of a test panel wherein a resinous foam laminate was prepared by extruding foamable polystyrene into a foam layer about ⅜ inch in thickness and thereafter applying sheets of paper about 13 mils thick to each side of the sheet of polystyrene by passing the layer of foamed polystyrene and paper sheets in adjacent relation between the platens of a laminating press maintained at a temperature of 425° F., a pressure of 10 p.s.i. and a speed which provides a residence time on the platens of 10 seconds. A coating of epoxy adhesive roughly 50 mils thick was applied to one of the laminated sheets of paper by means of a notched trowel. It is critical to the invention that in this step the adhesive so applied be permitted to permeate the paper thoroughly and further to seep onto the surface of the underlying resinous foam core. Adhesive bonds to the foam itself are necessary for strength and are essential to the invention. A thin coating of epoxy adhesive approximately 6 mils in thickness was applied with a doctor blade to the other paper sheet and heat cured. Marble chips approximately ⅛″ to ¼″ in diameter were then sprinkled onto the thick, uncured epoxy layer, followed by a sprinkling of coarse sand for color contrast. The chips were firmly set into the epoxy by passing the laminate under a roller and the epoxy was then allowed to cure at room temperature.

Various additional adaptations of the present invention may be used without departing from the spirit and scope of the present invention.

What is claimed is:
1. A laminated wall structure comprising:
 (A) a resinous foam core;
 (B) an absorbent paper facing sheet adhered to at least one side of the said resinous foam core;
 (C) an adhesive adhered to the said absorbent paper facing sheet and permeating it thereby coming into contact with and adhering to the said resinous foam core; and
 (D) an outer veneer surface adhered to the said adhesive.
2. A laminated wall structure according to claim 1 wherein the resinous foam core ranges in thickness from 0.05 inch to 2.0 inches and has a density of from 1–10 pounds per cubic foot.
3. A laminated wall structure according to claim 1 wherein the resinous foam core is selected from the group consisting of polystyrene, rubber-modified polystyrene and acrylonitrile-butadiene-styrene copolymer.
4. A laminated wall structure according to claim 1 wherein the resinous foam core is a polyurethane.
5. A laminated wall structure according to claim 1 wherein the adhesive is an epoxy resin.
6. A method of preparing a laminated wall structure which comprises:
 (A) adhering an absorbent paper facing sheet to at least one side of a resinous foam core;
 (B) applying an adhesive to the said absorbent paper facing sheet;
 (C) permitting the said adhesive to permeate the said paper facing sheet thereby coming into contact with and adhering to the said resinous foam core; and
 (D) adhering an outer veneer surface to the said adhesive.
7. A method according to claim 6 wherein the resinous foam core ranges in thickness from 0.05 inch to 2.0 inches and has a density of from 1–10 pounds per cubic foot.
8. A method according to claim 6 wherein the resinous foam core is selected from the group consisting of polystyrene, rubber-modified polystyrene and acrylonitrile-butadiene-styrene copolymers.
9. A method according to claim 6 wherein the resinous foam core is a polyurethane.
10. A method according to claim 6 wherein the adhesive is an epoxy resin.

References Cited

UNITED STATES PATENTS 3,415,714  12/1968  Hider _____ 161—160

FOREIGN PATENTS 1,306,771  9/1962  France.

WILLIAM J. VAN BALEN, Primary Examiner

U.S. Cl. X.R.

156—71; 161—161, 162